United States Patent

Yamasaki

(10) Patent No.: US 10,565,688 B2
(45) Date of Patent: Feb. 18, 2020

(54) IMAGE PROCESSING APPARATUS, IMAGE PROCESSING METHOD, AND IMAGE PROCESSING PROGRAM

(71) Applicant: OLYMPUS CORPORATION, Hachioji-shi, Tokyo (JP)

(72) Inventor: Teruaki Yamasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 124 days.

(21) Appl. No.: 15/867,390

(22) Filed: Jan. 10, 2018

(65) Prior Publication Data

US 2018/0130187 A1    May 10, 2018

Related U.S. Application Data

(63) Continuation of application No. PCT/JP2015/072761, filed on Aug. 11, 2015.

(51) Int. Cl.
*G06T 5/00* (2006.01)
*G06T 7/11* (2017.01)
(Continued)

(52) U.S. Cl.
CPC .............. *G06T 5/002* (2013.01); *G06T 5/20* (2013.01); *G06T 7/11* (2017.01); *H04N 1/409* (2013.01);
(Continued)

(58) Field of Classification Search
None
See application file for complete search history.

(56) References Cited

U.S. PATENT DOCUMENTS

2005/0100236 A1* 5/2005 Kong .................. H04N 19/176
                                                                382/261
2009/0214133 A1* 8/2009 Aoyama ................ H04N 19/86
                                                                382/268
(Continued)

FOREIGN PATENT DOCUMENTS

JP      2005192184 A    7/2005
JP      2008104139 A    5/2008
(Continued)

OTHER PUBLICATIONS

International Search Report (ISR) dated Oct. 27, 2015 issued in International Application No. PCT/JP2015/072761.
(Continued)

*Primary Examiner* — Vu Le
*Assistant Examiner* — Tracy Mangialaschi
(74) *Attorney, Agent, or Firm* — Holtz, Holtz & Volek PC (57) ABSTRACT

An image processing apparatus includes: a dispersion calculation unit for calculating a dispersion of pixel values in each of a plurality of pixel groups which are each composed of a pixel of interest and peripheral pixels around the pixel of interest in an image and in which the pixel of interest and the peripheral pixels are arranged in directions different from one another; and a gradation determination unit for determining whether or not the pixel of interest belongs to a gradation region on the basis of a magnitude relationship among the dispersions calculated by the dispersion calculation unit.

5 Claims, 6 Drawing Sheets

(51) Int. Cl.
  *H04N 5/20* (2006.01)
  *G06T 5/20* (2006.01)
  *H04N 5/21* (2006.01)
  *H04N 1/409* (2006.01)
  *H04N 1/40* (2006.01)

(52) U.S. Cl.
  CPC ................. *H04N 5/20* (2013.01); *H04N 5/21* (2013.01); *G06T 2207/20012* (2013.01); *G06T 2207/20028* (2013.01); *G06T 2207/20192* (2013.01); *H04N 1/40062* (2013.01)

(56) References Cited

U.S. PATENT DOCUMENTS

| | | | | |
|---|---|---|---|---|
| 2010/0110235 | A1* | 5/2010 | Higuchi | G06T 5/002 348/241 |
| 2013/0070304 | A1* | 3/2013 | Suzuki | H04N 1/4092 358/3.27 |
| 2014/0267839 | A1* | 9/2014 | Nishimaki | H04N 5/367 348/246 |
| 2014/0293299 | A1* | 10/2014 | Ozawa | H04N 1/40062 358/1.9 |

FOREIGN PATENT DOCUMENTS

| | | | |
|---|---|---|---|
| JP | 2013076986 A | | 4/2013 |
| JP | 2013110528 A | * | 6/2013 |
| JP | 2013110528 A | | 6/2013 |
| JP | 5352191 B2 | | 11/2013 |
| JP | 2014179939 A | | 9/2014 |

OTHER PUBLICATIONS

Written Opinion dated Oct. 27, 2015 issued in International Application No. PCT/JP2015/072761.

* cited by examiner

|  | LOW-CONTRAST TEXTURE REGION | LOW-CONTRAST EDGE REGION | GRADATION REGION |
|---|---|---|---|
| FIRST CONDITION | SATISFIED | NOT SATISFIED | SATISFIED |
| SECOND CONDITION | NOT SATISFIED | SATISFIED | SATISFIED |

FIG. 5

IMAGE PROCESSING APPARATUS, IMAGE PROCESSING METHOD, AND IMAGE PROCESSING PROGRAM

CROSS-REFERENCE TO RELATED APPLICATIONS

This is a Continuation Application of International Application No. PCT/JP2015/072761 filed on Aug. 11, 2015. The content of International Application No. PCT/JP2015/072761 is hereby incorporated herein by reference in its entirety.

TECHNICAL FIELD

The present invention relates to an image processing apparatus, an image processing method, and an image processing program for identifying gradation in an image.

BACKGROUND ART

There is a known image processing apparatus for determining to which of an edge section, a flat section, and a gradation section a pixel of interest in an image belongs (refer to, for example, PTL 1). In PTL 1, a block composed of a pixel of interest and pixels adjacent to the pixel of interest is set in an image, a spatial frequency included in the block is calculated by applying discrete cosine transformation to the pixel values in the block, and, on the basis of the spatial frequency, it is determined to which of an edge section, a flat section, and a gradation section the pixel of interest belongs.

CITATION LIST

Patent Literature

{PTL 1}
Publication of Japanese Patent No. 5352191

SUMMARY OF INVENTION

A first aspect of the present invention is an image processing apparatus including: a dispersion calculation unit that calculates a dispersion of pixel values in each of a plurality of pixel groups which are each composed of a pixel of interest and peripheral pixels around the pixel of interest in an image and in which the pixel of interest and the peripheral pixels are arranged in directions different from one another; and a gradation determination unit that determines whether or not the pixel of interest belongs to a gradation region on the basis of a magnitude relationship among the dispersions calculated by the dispersion calculation unit.

DESCRIPTION OF EMBODIMENTS

An image processing apparatus 1 according to an embodiment of the present invention will now be described with reference to the drawings.

Figure 1:
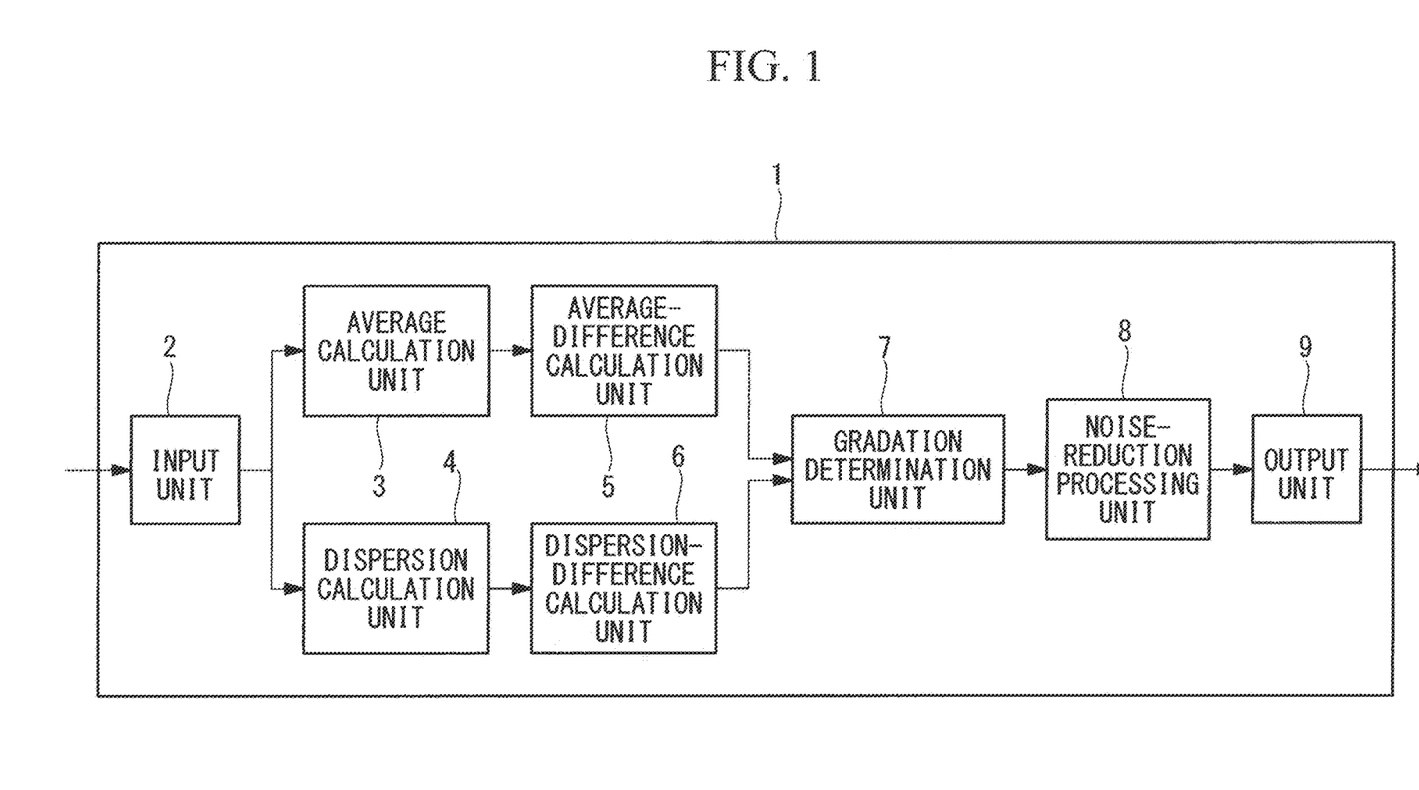
FIG. 1 is a block diagram showing functions of an image processing apparatus according to an embodiment of the present invention.

As shown in FIG. 1, the image processing apparatus 1 according to this embodiment includes: an input unit 2 to which image data A is input; an average calculation unit 3 for calculating the average of pixel values in each of a plurality of pixel groups in a processed region B of the image data A; a dispersion calculation unit 4 for calculating the dispersion of pixel values in each of the plurality of pixel groups in the processed region B; an average-difference calculation unit 5 for calculating the difference between the averages calculated by the average calculation unit 3; a dispersion-difference calculation unit 6 for calculating the difference between the dispersions calculated by the dispersion calculation unit 4; a gradation determination unit 7 for determining whether or not a pixel of interest C in the processed region B belongs to a gradation region; a noise-reduction processing unit 8 for applying noise-reduction processing to each pixel of the image data A; and an output unit 9 for outputting the image data A to which the noise-reduction processing has been applied.

The input unit 2 is connected to an external device disposed outside the image processing apparatus 1, and the image data A is input from this external device to the input unit 2. The image data A that has been input to the input unit 2 is transmitted to the average calculation unit 3.

Figure 2:
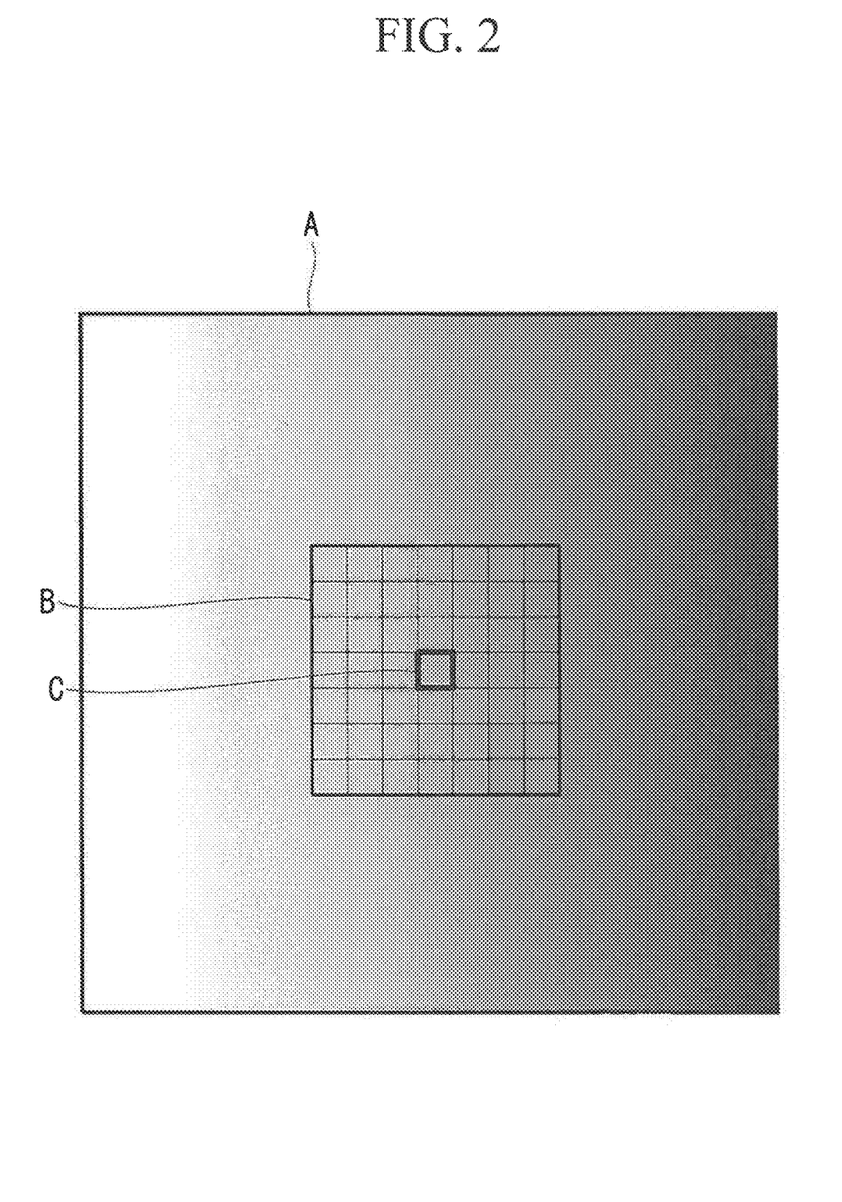
FIG. 2 is a diagram showing a processed region in an image

As shown in FIG. 2, the processed region B is a region composed of pixels in a plurality of rows and a plurality of columns and includes the single pixel of interest C and a plurality of peripheral pixels around the pixel of interest C. This example assumes that the processed region B is composed of pixels in seven rows and seven columns as an example.

Five pixel groups G1 to G5 each containing the pixel of interest C and a plurality of peripheral pixels are set in the processed region B.

Figure 3A:
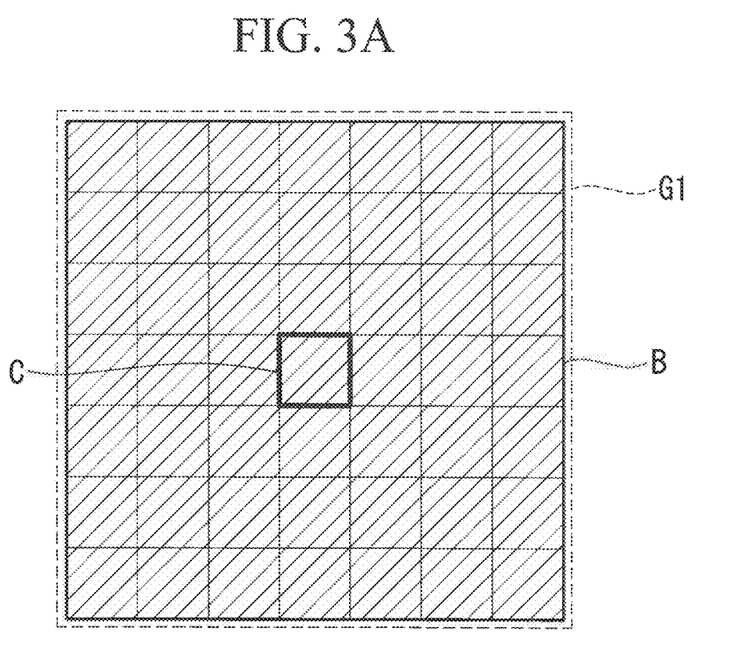
FIG. 3A is a diagram showing a first pixel group in the processed region.
Figure 3B:
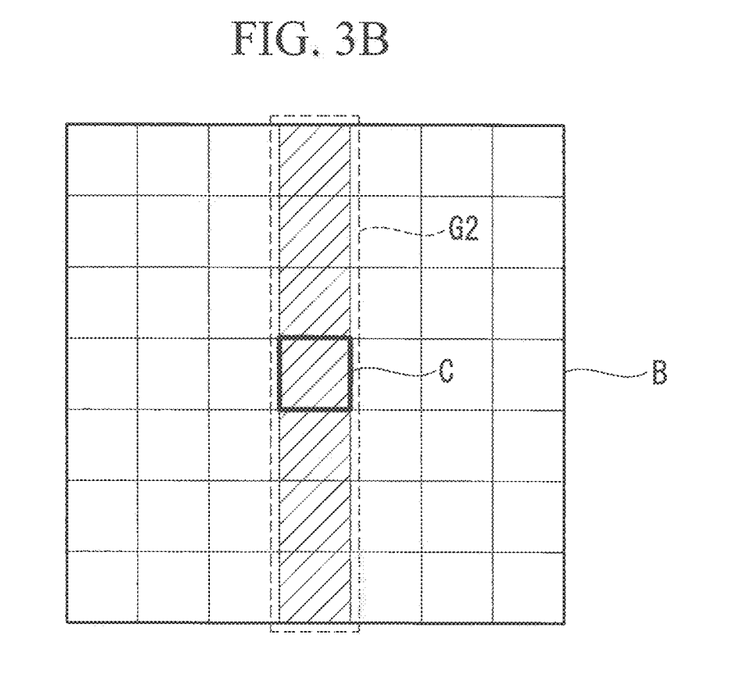
FIG. 3B is a diagram showing a second pixel group in the processed region.
Figure 3C:
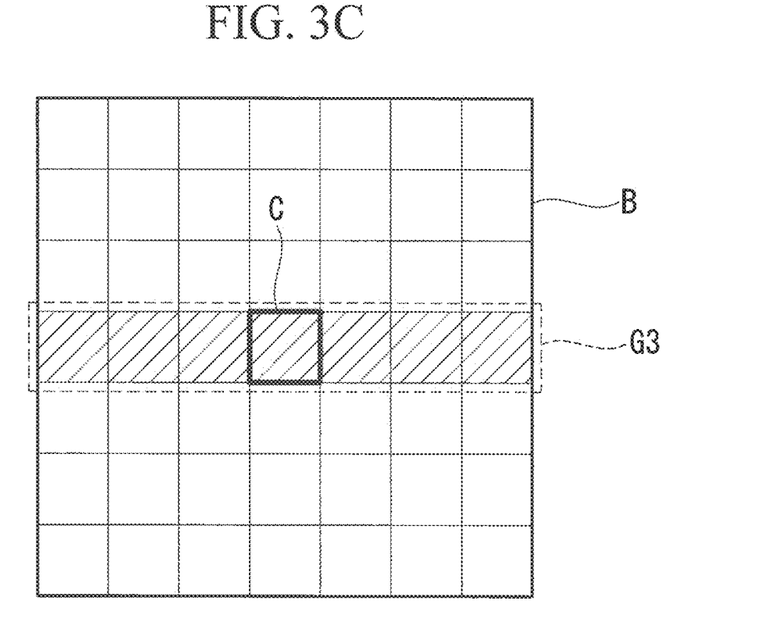
FIG. 3C is a diagram showing a third pixel group in the processed region.
Figure 3D:
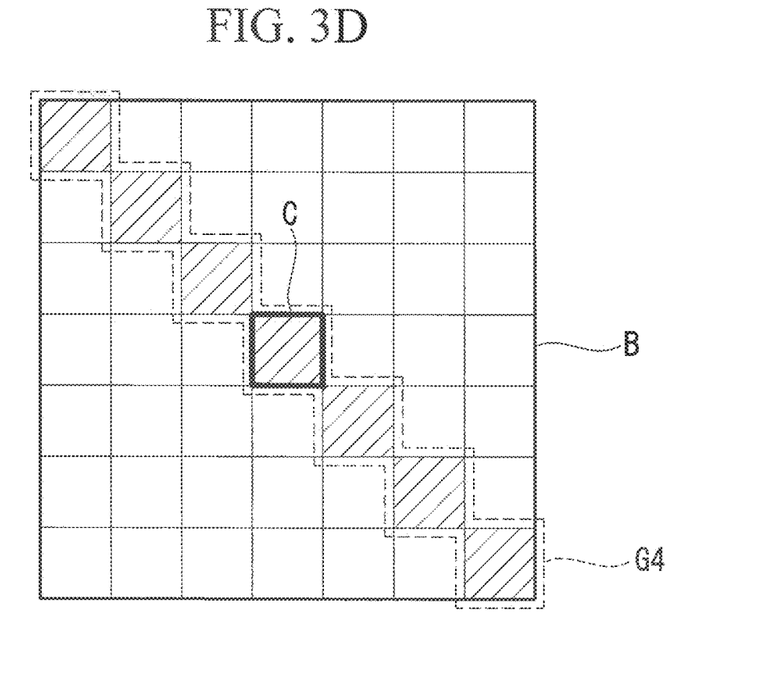
FIG. 3D is a diagram showing a fourth pixel group in the processed region.
Figure 3E:
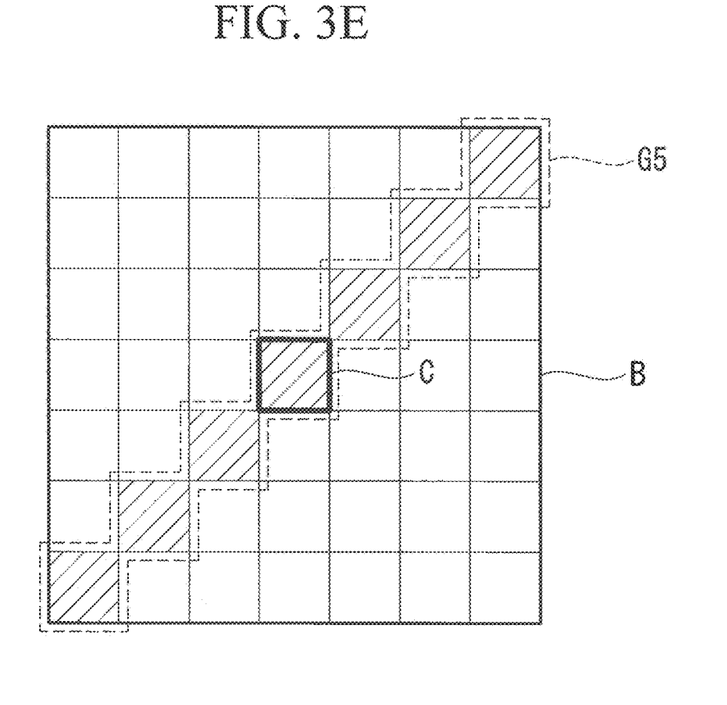
FIG. 3E is a diagram showing a fifth pixel group in processed region.
Figure 4:
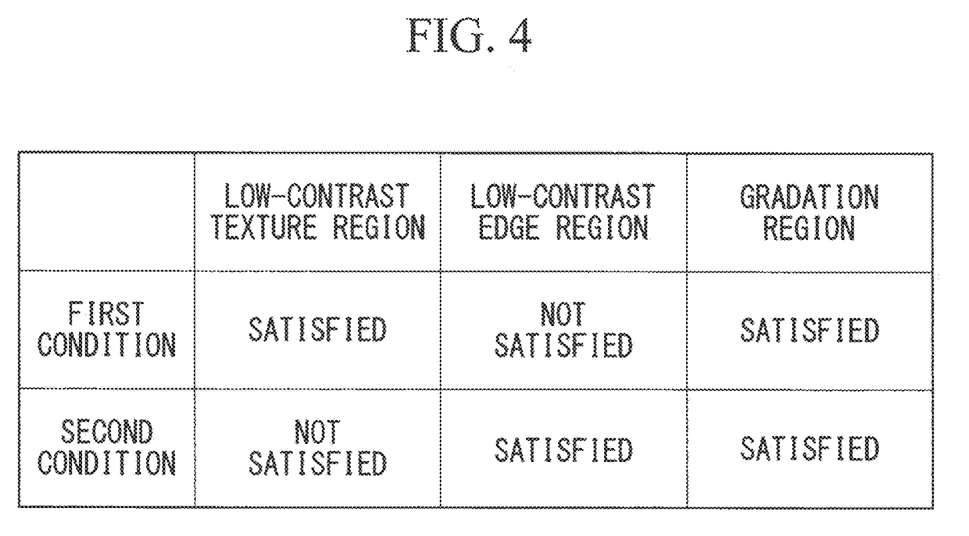
FIG. 4 is a diagram illustrating a method for identifying a gradation region, a low-contrast texture region, and a low-contrast edge region.

As shown in FIG. 3A, the first pixel group G1 is composed of all pixels in the processed region B. As shown in FIG. 3B, the second pixel group G2 is composed of pixels in one column containing the pixel of interest C. As shown in FIG. 3C, the third pixel group G3 is composed of pixels in one row containing the pixel of interest C. As shown in FIG. 3D, the fourth pixel group G4 is composed of pixels, containing the pixel of interest C, arranged in a diagonal direction from the upper left to the lower right. As shown in FIG. 3E, the fifth pixel group G5 is composed of pixels, containing the pixel of interest C, arranged in a diagonal direction from the upper right to the lower left.

The average calculation unit 3 calculates, as a reference average, an arithmetic average AVE1 of the pixel values of 49 pixels belonging to the first pixel group G1. In addition, the average calculation unit 3 calculates arithmetic averages (hereinafter, referred to simply as "averages") AVE2, AVE3, AVE4, and AVE5 of the pixel values of the seven pixels belonging to the second to fifth pixel groups G2 to G5, respectively.

The dispersion calculation unit 4 calculates, as a reference standard deviation (reference dispersion), a standard deviation STD1 of the pixel values of the 49 pixels belonging to the first pixel group G1. In addition, the dispersion calculation unit 4 calculates standard deviations STD2, STD3, STD4, and STD5 of the pixel values of the seven pixels belonging to the second to fifth pixel groups G2 to G5, respectively.

The average-difference calculation unit 5 calculates first, second, third, and fourth average differences DIF_ave1, DIF_ave2, DIF_ave3, and DIF_ave4, as shown in expressions (1) to (4) below. The first, second, third, and fourth average differences DIF_ave1, DIF_ave2, DIF_ave3, and DIF_ave4 are the absolute values of the differences between the first average AVE1 and the second, third, fourth, and fifth averages AVE2, AVE3, AVE4, AVE5, respectively. The calculated four average differences DIF_ave1, DIF_ave2, DIF_ave3, and DIF_ave4 are transmitted to the gradation determination unit 7.

$$DIF\_ave1=|AVE1-AVE2| \quad (1)$$

$$DIF\_ave2=|AVE1-AVE3| \quad (2)$$

$$DIF\_ave3=|AVE1-AVE4| \quad (3)$$

$$DIF\_ave4=|AVE1-AVE5| \quad (4)$$

The dispersion-difference calculation unit 6 calculates first, second, third, and fourth dispersion differences DIF_std1, DIF_std2, DIF_std3, and DIF_std4, as shown in expressions (5) to (8) below. The first, second, third, and fourth dispersion differences DIF_std1, DIF_std2, DIF_std3, and DIF_std4 are the absolute values of the differences between the first standard deviation STD1 and the second, third, fourth, and fifth standard deviations STD2, STD3, STD4, and STD5, respectively. The four calculated dispersion differences DIF_std1, DIF_std2, DIF_std3, and DIF_std4 are transmitted to the gradation determination unit 7.

$$DIF\_std1=|STD1-STD2| \quad (5)$$

$$DIF\_std2=|STD1-STD3| \quad (6)$$

$$DIF\_std3=|STD1-STD4| \quad (7)$$

$$DIF\_std4=|STD1-STD5| \quad (8)$$

The gradation determination unit 7 determines whether or not the four average differences DIF_ave1, DIF_ave2, DIF_ave3, and DIF_ave4 satisfy a first condition. The first condition is satisfied when all the four average differences DIF_ave1, DIF_ave2, DIF_ave3, and DIF_ave4 are equal to or smaller than a predetermined first threshold value $\alpha$.

Furthermore, the gradation determination unit 7 determines whether or not the four dispersion differences DIF_std1, DIF_std2, DIF_std3, and DIF_std4 satisfy a second condition. The second condition is satisfied when only one of the four dispersion differences DIF_std1, DIF_std2, DIF_std3, and DIF_std4 is larger than a predetermined second threshold value $\beta$ and the other three are equal to or smaller than the predetermined threshold value $\beta$.

The gradation determination unit 7 determines that the pixel of interest C belongs to a gradation region when both the first condition and the second condition are satisfied. On the other hand, the gradation determination unit 7 determines that the pixel of interest C does not belong to a gradation region when at least one of the first condition and the second condition is not satisfied. The determination result made by the gradation determination unit 7 is transmitted to the noise-reduction processing unit 8.

When it is determined by the gradation determination unit 7 that the pixel of interest C belongs to a gradation region, the noise-reduction processing unit 8 selects first noise-reduction processing and applies the first noise-reduction processing to the pixel of interest C. On the other hand, when it is determined by the gradation determination unit 7 that the pixel of interest C does not belong to a gradation region, the noise-reduction processing unit 8 selects second noise-reduction processing and applies the second noise-reduction processing to the pixel of interest C.

The first noise-reduction processing is processing suitable for reducing noise in a gradation region. For such processing, a smoothing filter or DCT coring processing is used. A smoothing filter is processing for setting the pixel value of a pixel of interest to the average of the pixel values of peripheral pixels surrounding the pixel of interest. DCT coring processing is processing for applying discrete cosine transformation to the pixel values in a processed region and removing, from the obtained spatial frequency, frequency components equal to or smaller than a predetermined threshold value.

The second noise-reduction processing is arbitrary noise-reduction processing. For such processing, a bilateral filter, a non-local means filter, or a BM3D (Block-matching and 3D) filter is used, for example. A bilateral filter is processing for weighting the pixel value of each of peripheral pixels according to the distance from a pixel of interest thereto and the degree of similarity thereof to the pixel of interest in terms of pixel value and setting the pixel value of the pixel of interest to the average of the weighted pixel values of the peripheral pixels. A non-local means filter is processing for calculating a weighting on the basis of the degree of similarity between peripheral blocks and a block containing a pixel of interest as a center and setting the pixel value of the pixel of interest to the average of the weighted pixel values of the center pixels in the peripheral blocks. A BM3D filter, as an advanced version of the non-local means filter, subjects matched blocks to frequency transformation and then performs noise-reduction processing in frequency space.

As a result of processing being performed by the above-described units 3, 4, 5, 6, 7, and 8 for each of the pixels in the image data A as the pixel of interest C, all pixels in the image data A are subjected to either of the first noise-reduction processing and the second noise-reduction processing. The image data A that has been subjected to noise-reduction processing is transmitted to the output unit 9.

The output unit 9 is connected to another external device (e.g., a display) disposed outside the image processing apparatus 1, and the image data A that has been subjected to noise-reduction processing is output from the output unit 9 to the external device.

Next, an image processing method performed by the image processing apparatus 1 with this configuration will be described.

Figure 5:
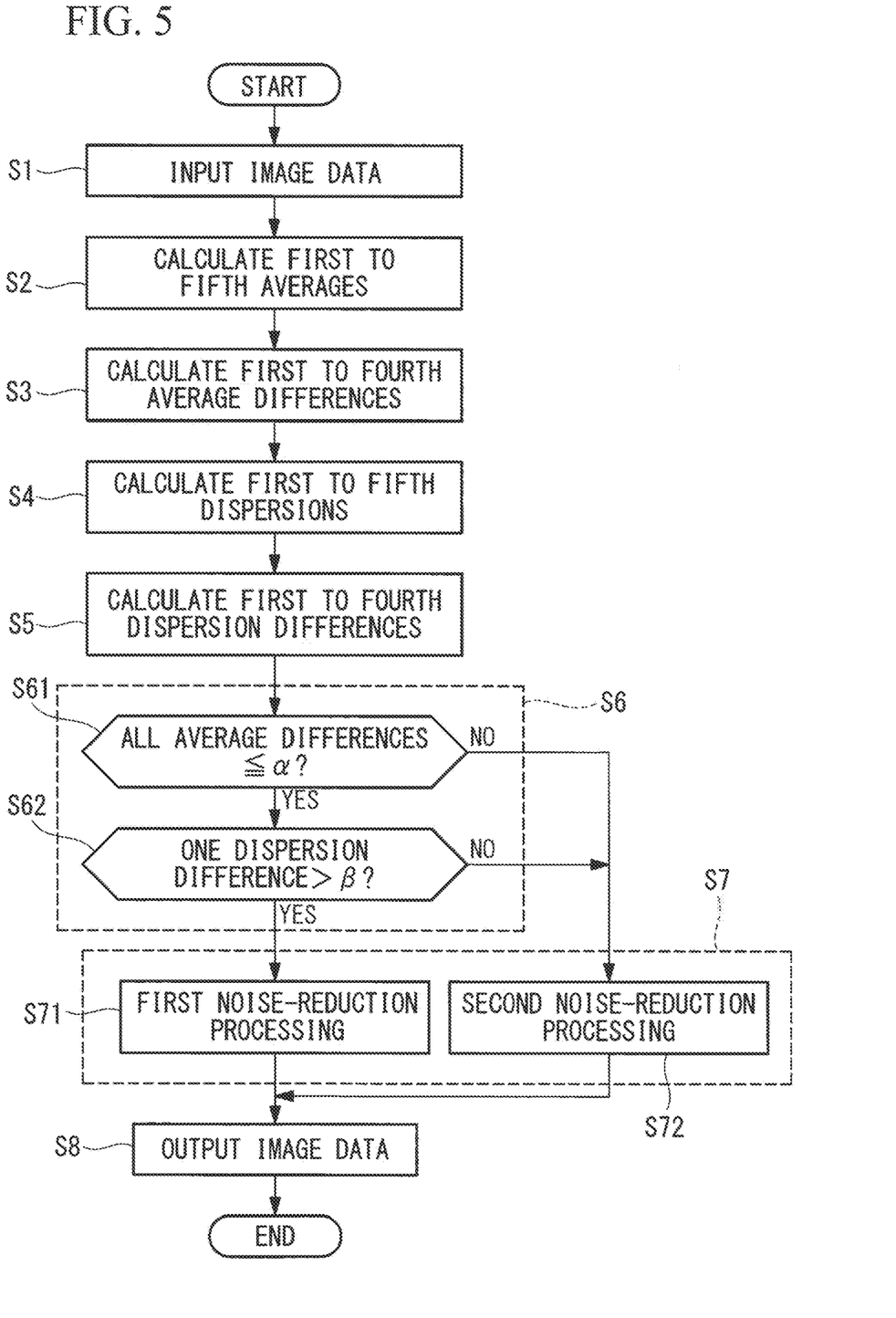
FIG. 5 is a flowchart illustrating an image processing method implemented with the image processing apparatus in FIG. 1.

As shown in FIG. 5, the image processing method according to this embodiment includes: step S1 for acquiring the image data A; step S2 for calculating the averages AVE1 to AVE5 of the pixel values in the first to fifth pixel groups G1 to G5 from the image data A; step S3 for calculating the average differences DIF_ave1 to DIF_ave4 from the averages AVE1 to AVE5; step S4 for calculating the dispersions STD1 to STD5 of the pixel values in the first to fifth pixel groups G1 to G5 from the image data A; step S5 for calculating the dispersion differences DIF_std1 to DIF_std4 from the dispersions STD1 to STD5; step 6 for determining whether or not the pixel of interest C belongs to a gradation region on the basis of the average differences DIF_ave1 to DIF_ave4 and the dispersion differences DIF_std1 to DIF_std4; step S7 for applying noise-reduction processing of the type based on the determination result to the pixel of interest C; and step 8 for outputting the image data A that has been subjected to noise-reduction processing.

In step S1, one item of image data A is input to the input unit 2.

In step S2, the average AVE1 of the pixel values of all pixels in the processed region B having the pixel of interest C as the center thereof in the image data A is calculated. Furthermore, the averages AVE2 to AVE5 of the pixel values in the second to fifth pixel groups G2 to G5 composed of pixels arranged in directions different from one another in the processed region B are calculated.

In step S3, the absolute values DIF_ave1 to DIF_ave4 of the differences between the respective second to fifth averages AVE2 to AVE5 and the first average AVE1 are calculated.

In step S4, the standard deviation STD1 of the pixel values of all pixels in the processed region B is calculated. Furthermore, the standard deviation STD2 to STD5 of the pixel values in the second to fifth pixel groups G2 to G5 composed of pixels arranged in directions different from one another in the processed region B are calculated.

In step S5, the absolute values DIF_std1 to DIF_std4 of the differences between the respective second to fifth standard deviations STD2 to STD5 and the first average STD1 are calculated.

Step S6 includes step S61 for determining whether or not the first to fourth average differences DIF_ave1 to DIF_ave4 satisfy the first condition and step S62 for determining whether or not the first to fourth dispersion differences DIF_std1 to DIF_std4 satisfy the second condition.

When all the first to fourth average differences DIF_ave1 to DIF_ave4 are equal to or smaller than the first threshold value $\alpha$ in step S61, the flow proceeds to step S62. On the other hand, when at least one of the first to fourth average differences DIF_ave1 to DIF_ave4 is larger than the first threshold value $\alpha$ in step S61, the flow proceeds to step S72.

When the pixel of interest C belongs to either of a gradation region and a low-contrast texture region, all the first to fourth average differences DIF_ave1 to DIF_ave4 are equal to or smaller than the first threshold value $\alpha$. This is because the extent of the change in pixel values is small in a gradation region and a low-contrast texture region. Such a characteristic is specific to a gradation region and a low-contrast texture region, and a low-contrast edge region does not have such a characteristic. Therefore, in step S61, it is determined whether the pixel of interest C belongs to either of a gradation region and a low-contrast texture region or to a region other than these regions.

When only one of the first to fourth dispersion differences DIF_std1 to DIF_std4 is larger than the second threshold value $\beta$ in step S62, the flow proceeds to step S71. On the other hand, when two or more of the first to fourth dispersion differences DIF_std1 to DIF_std4 are larger than the second threshold value $\beta$ or all of them are equal to or smaller than the second threshold value $\beta$ in step S62, the flow proceeds to step S72.

When the pixel of interest C belongs to a gradation region, only one of the first to fourth dispersion differences DIF_std1 to DIF_std4 is larger than the second threshold value $\beta$. This is because pixel values uniformly decrease or increase in one direction in a gradation region. In other words, from among the first to fifth standard deviations STD1 to STD5, only the standard deviation of the pixel group in a direction orthogonal to the gradient direction of pixel values is substantially zero, and the other four standard deviations have magnitudes substantially identical to one another according to the magnitudes of the gradients of pixel values. When the gradient direction of pixel values in a gradation region is, for example, the row direction as shown in FIG. 2, only the standard deviation STD2 of the second pixel group G2 in the column direction becomes substantially zero. Therefore, only one of the first to fourth dispersion differences DIF_std1 to DIF_std4 has a value significantly larger than zero and the other three dispersion differences become substantially zero.

When the pixel of interest C belongs to a low-contrast edge region, only one of the four dispersion differences DIF_std1 to DIF_std4 also becomes larger than the second threshold value $\beta$.

In contrast, the above-described magnitude relationship among the first to fifth standard deviations STD1 to STD5 is not satisfied in a low-contrast texture region in which changes in pixel value are irregular.

Therefore, in step S62, it is determined to which of a gradation region and a low-contrast texture region the pixel of interest C belongs. Here, in the stage of step 62, a low-contrast edge region and a gradation region have been determined. Therefore, in step S62, the pixel of interest is identified as a gradation region or a low-contrast texture region.

Step S7 includes step S71 for applying first image processing to the pixel of interest C and step S72 for applying second image processing to the pixel of interest C. In step S71, the first noise-reduction processing is applied to the pixel of interest C belonging to a gradation region. In step S72, the second noise-reduction processing is applied to the pixel of interest C belonging to a region other than a gradation region.

Steps S2 to S7 above are performed with all pixels in the image data A being set as the pixel of interest C. The image data A all pixels of which have been subjected to noise-reduction processing is output to the external device in step S8.

In this manner, this embodiment affords an advantage in which a gradation region can be easily and correctly identified on the basis of the fact that, in a gradation region, the standard deviation of pixel values becomes substantially zero in a direction orthogonal to the gradient direction of pixel values and the standard deviations of pixel values have substantially identical magnitudes in other directions. Another advantage is that noise-reduction processing suitable for each pixel can be performed.

Furthermore, this embodiment affords an advantage in which a region to which the pixel of interest C belongs can be correctly identified by using the averages AVE1 to AVE5 and the standard deviations STD1 to STD5 without being affected by noise contained in the image data A.

More specifically, when noise is contained in the image data A, the noise is eliminated by being averaged in the averages AVE1 to AVE5 calculated from a plurality of pixel values. Therefore, even when noise is contained in the image data A, it can also be correctly determined whether or not the pixel of interest C belongs to either of a gradation region and a low-contrast texture region, on the basis of the averages AVE1 to AVE5, without being affected by the noise.

In addition, when noise is contained in the image data A, the dispersion in pixel value due to the noise is equally added to all the standard deviations STD1 to STD5. Therefore, the magnitude relationship among the standard deviations STD1 to STD5 does not differ between when noise is contained in the image data A and when noise is not contained. Because of this, it can be correctly determined to which of a gradation region and a low-contrast texture region the pixel of interest C belongs, on the basis of the standard deviations STD1 to STD5, without being affected by the noise.

Furthermore, the average AVE1 of the pixel values of all pixels in the processed region B is a value with further reduced noise, compared with the values of the averages AVE2 to AVE5. This leads to an advantage in which by setting such an average AVE1 as the reference average and obtaining the differences between the averages AVE2 to AVE5 and the reference AVE1, comparison and determination of the magnitude relationships among the averages AVE2 to AVE5 can be easily and more correctly performed.

In addition, the standard deviation STD1 of the pixel values of all pixels in the processed region B is a value containing dispersions in pixel values in all directions. This leads to an advantage in which by setting such a standard deviation STD1 as the standard deviation and obtaining the differences between the standard deviations STD2 to STD5 and the reference standard deviation STD1, comparison and determination of the magnitude relationships among the averages STD2 to STD5 can be easily and more correctly performed.

Furthermore, the averages AVE1 to AVE5 and the standard deviations STD1 to STD5 of pixel values require a smaller amount of calculation than the calculation of a spatial frequency. Therefore, there is an advantage in which the time required to determine the pixel of interest C can be reduced.

This embodiment has been described by way of an example wherein the average calculation unit 3 calculates an arithmetic average as an index of the average of pixel values. Instead of this, another index, such as a geometric average, a harmonic average, a weighted average, or a root average square (RMS), may be calculated.

In addition, this embodiment has been described by way of an example wherein the dispersion calculation unit 4 uses the standard deviation as an index of the dispersion in pixel value in each pixel group. Instead of this, another index, such as a variance, an average absolute deviation, an interquartile range, or a range, may be used. A range refers to the distribution width (i.e., difference between the maximum pixel value and the minimum pixel value) of pixel values in each of the pixel groups G1 to G5.

In addition, although this embodiment has been described by way of an example wherein the averages AVE2 to AVE5 and the dispersions STD2 to STD5 of the four pixel groups G2 to G5 in the column direction, row direction, and two diagonal directions are calculated, the direction and number of pixel groups are not limited to those described above but can be set arbitrarily.

In addition, although this embodiment has been described by way of example of the processed region B composed of pixels in seven rows and seven columns, the size of the processed region B can be modified as appropriate. The size of the processed region B may be set according to the ISO speed with which image data has been acquired, for example, so as to set a larger processed region for image data acquired with high sensitivity and to set a smaller processed region for image data acquired with low sensitivity.

In addition, in this embodiment, the four average differences DIF_ave1 to DIF_ave4 and the four dispersion differences DIF_std1 to DIF_std4 are used by the gradation determination unit 7 for determination. Instead of this, another index may be used.

For example, a single index may be calculated by adding, subtracting, multiplying, or dividing the four average differences DIF_ave1 to DIF_ave4, so that it may be determined whether or not the pixel of interest C belongs to either of a gradation region and a low-contrast texture region on the basis of the single calculated index. In the same manner, a single index may be calculated by adding, subtracting, multiplying, or dividing the four dispersion differences DIF_std1 to DIF_std4, so that it may be determined to which of a gradation region and a low-contrast texture region the pixel of interest C belongs on the basis of the single calculated index.

Furthermore, in this embodiment, the absolute values of the differences between the second to fourth averages AVE2 to AVE4 and the first average AVE1 are used as the average differences DIF_ave1 to DIF_ave4. Instead of this, the square differences between each of the second to fourth averages AVE2 to AVE4 and the first average AVE1 may be used. Alternatively, the value obtained by dividing the sum of each of the second to fourth averages AVE2 to AVE4 and the first average AVE1 by the first average AVE1 may be used. Alternatively, the sum of each of the second to fourth averages AVE2 to AVE4 and the first average AVE1 may be multiplied by the first average, and the value obtained by dividing the calculated product by the square of the first average AVE1 may be used.

In addition, although this embodiment has been described by way of an example wherein the image processing apparatus 1 has a hardware configuration like a dedicated processor, and the units 3, 4, 5, 6, 7, and 8 for performing the processing in steps S2 to S7 are realized by dedicated circuits, the processing in steps S2 to S7 may be realized by software. In this case, the image processing apparatus 1 includes: a central processing unit (CPU); a main storage device such as a RAM; and an auxiliary storage device. The auxiliary storage device is a computer-readable non-temporary storage medium, such as a hard disk or various types of memories, and stores an image processing program for causing the CPU to execute steps S2 to S7. The above-described processing in steps S2 to S7 is realized as a result of this image processing program being loaded from the auxiliary storage device to the main storage device and being executed.

In addition, each of the units described in this embodiment may be implemented as one chip or may be implemented in a divided manner on a wiring substrate.

The inventor has arrived at the following aspects of the present invention.

A first aspect of the present invention is an image processing apparatus including: a dispersion calculation unit that calculates a dispersion of pixel values in each of a plurality of pixel groups which are each composed of a pixel of interest and peripheral pixels around the pixel of interest in an image and in which the pixel of interest and the peripheral pixels are arranged in directions different from one another; and a gradation determination unit that determines whether or not the pixel of interest belongs to a gradation region on the basis of a magnitude relationship among the dispersions calculated by the dispersion calculation unit.

According to the first aspect of the present invention, the dispersions of pixel values in a plurality of pixel groups, which include a pixel of interest and are arranged in directions different from one another, are calculated by the dispersion calculation unit. When the pixel of interest belongs to a gradation region, only the dispersion of pixel values in the pixel group in a direction orthogonal to the gradient direction of pixel values becomes substantially zero, and the dispersions of the pixel values in pixel groups in other directions become significantly larger than zero. Although such a magnitude relationship among the dispersions is satisfied when the pixel of interest belongs to a gradation region, this magnitude relationship is not satisfied when the pixel of interest belongs to a low-contrast texture region. Therefore, it can be determined by the gradation determination unit whether or not the pixel of interest belongs to a gradation region on the basis of the magnitude relationship among the dispersions of pixel values in pixel groups in a plurality of directions.

In this case, because the dispersion due to noise in the image is equally added to the dispersions of pixel values in all the pixel groups, the magnitude relationship among the dispersions becomes the same when the image contains noise and when the image does not contain noise. Therefore, even when the image contains noise, a gradation region can be correctly identified as being clearly differentiated from a low-contrast texture region. Furthermore, the amount of calculation required for this determination can be reduced by using a dispersion, which requires a smaller amount of calculation than the spatial frequency.

In this description, a "gradation region" refers to a region in which the pixel values in a relatively large area of an image gradually change in one direction. A "low-contrast edge region" refers to a region in which the variation in pixel values is sharp but the variation difference is small. A "low-contrast texture region" refers to a region in which pixel values increase and decrease irregularly and the variation difference is small.

In the first aspect, it is preferable that the dispersion calculation unit calculates, as a reference dispersion, a dispersion of pixel values of all pixels in a processed region composed of the pixel of interest and peripheral pixels having the pixel of interest as its center, the image processing apparatus further comprises a dispersion-difference calculation unit which calculates absolute values of differences between the respective dispersions of the plurality of pixel groups and the reference dispersion, and the gradation determination unit determines that the pixel of interest belongs to the gradation region when only one of the absolute values calculated by the dispersion-difference calculation unit is larger than a predetermined threshold value and determines that the pixel of interest does not belong to the gradation region when two or more of the absolute values calculated by the dispersion-difference calculation unit are larger than the predetermined threshold value or when all of the absolute values are equal to or smaller than the predetermined threshold value.

By doing so, the magnitude relationship among the dispersions can be compared and determined easily.

The first aspect may include an average calculation unit which calculates an average of the pixel values in each of the plurality of pixel groups, wherein the gradation determination unit determines whether or not the pixel of interest belongs to either of the gradation region and a low-contrast texture region on the basis of the averages calculated by the average calculation unit.

The averages of pixel values in a gradation region and a low-contrast texture region in which pixel values change gently are substantially the same in all directions. Therefore, it can be determined whether or not the pixel of interest belongs to either of a gradation region and a low-contrast texture region on the basis of the averages of pixel values in pixel groups in a plurality of directions. In particular, whether the pixel of interest belongs to a gradation region or to another region including a low-contrast edge region can be determined even more correctly on the basis of two conditions using the dispersions and the averages.

In the first aspect, it is preferable that the average calculation unit calculates, as a reference average, an average of pixel values of all pixels in a processed region composed of the pixel of interest and peripheral pixels having the pixel of interest as its center, the image processing apparatus further comprises an average-difference calculation unit which calculates absolute values of differences between the respective averages of the plurality of pixel groups and the reference average, and the gradation determination unit determines that the pixel of interest belongs to either of the gradation region and the low-contrast texture region when all of the absolute values calculated by the average-difference calculation unit are equal to or smaller than a predetermined threshold value and determines that the pixel of interest does not belong to both of the gradation region and the low-contrast texture region when at least one of the absolute values calculated by the average-difference calculation unit is larger than the predetermined threshold value.

By doing so, whether the pixel of interest belongs to either of a gradation region and a low-contrast texture region or to another region including a low-contrast edge region can be determined on the basis of the magnitude relationship among the absolute values calculated by the average-difference calculation unit. Furthermore, the magnitude relationship among the plurality of averages can be compared and determined easily.

In the first aspect, it is preferable that each of the directions in which the pixels constituting the plurality of pixel groups are arranged are at least one of a row direction, a column direction, and each of two diagonal directions orthogonal to each other in the image.

By doing so, the accuracy for identifying a gradation region can be enhanced.

A second aspect of the present invention is an image processing method including: calculating a dispersion of pixel values in each of a plurality of pixel groups which are each composed of a pixel of interest and peripheral pixels around the pixel of interest in an image and in which the pixel of interest and the peripheral pixels are arranged in directions different from one another; and determining whether or not the pixel of interest belongs to a gradation region on the basis of a magnitude relationship among the calculated dispersions.

A third aspect of the present invention is an image processing program which causes a computer to execute processing including: calculating a dispersion of pixel values in each of a plurality of pixel groups which are each composed of a pixel of interest and peripheral pixels around the pixel of interest in an image and in which the pixel of interest and the peripheral pixels are arranged in directions different from one another; and determining whether or not the pixel of interest belongs to a gradation region on the basis of a magnitude relationship among the calculated dispersions.

The aforementioned aspects afford an advantage in which a gradation region can be easily identified with a small amount of calculation even for an image containing noise.

REFERENCE SIGNS LIST

1 Image processing apparatus
2 Input unit
3 Average calculation unit
4 Dispersion calculation unit
5 Average-difference calculation unit
6 Dispersion-difference calculation unit
7 Gradation determination unit
8 Noise-reduction processing unit
9 Output unit
A Image data
B Processed region
C Pixel of interest

The invention claimed is:

1. An image processing apparatus comprising:
a dispersion calculation circuit that calculates a dispersion of pixel values in each of a plurality of pixel groups which are each composed of a pixel of interest and peripheral pixels around the pixel of interest in an image and in which the pixel of interest and the peripheral pixels are arranged in directions different from one another, the dispersion calculation circuit being configured to calculate, as a reference dispersion, a dispersion of pixel values of all pixels in a processed region composed of the pixel of interest and peripheral pixels having the pixel of interest as its center;
a dispersion-difference calculation circuit which calculates absolute values of dispersion differences between the respective dispersions of the plurality of pixel groups and the reference dispersion;
an average calculation circuit which calculates an average of the pixel values in each of the plurality of pixel groups, the average calculation circuit being configured to calculate, as a reference average, an average of pixel values of the all pixels in the processed region;
an average-difference calculation circuit which calculates absolute values of average differences between the respective averages of the plurality of pixel groups and the reference average; and
a gradation determination circuit that determines whether or not the pixel of interest belongs to a gradation region,
wherein the gradation determination circuit determines that the pixel of interest belongs to the gradation region when all the absolute values of average differences are equal to or smaller than a first predetermined threshold value and only one of the absolute values of dispersion differences is larger than a second predetermined threshold value, and the gradation determination circuit determines that the pixel of interest does not belong to the gradation region when two or more of the absolute values of dispersion differences are larger than the second predetermined threshold value or when all of the absolute values of dispersion differences are equal to or smaller than the second predetermined threshold value.

2. The image processing apparatus according to claim 1, wherein the gradation determination circuit determines whether the pixel of interest belongs to the gradation region or a low-contrast texture region based on the averages calculated by the average calculation circuit.

3. The image processing apparatus according to claim 1, wherein the different directions in which the pixels constituting the plurality of pixel groups are arranged include at least one of a row direction, a column direction, and two diagonal directions orthogonal to each other in the image.

4. An image processing method comprising:
calculating a dispersion of pixel values in each of a plurality of pixel groups which are each composed of a pixel of interest and peripheral pixels around the pixel of interest in an image and in which the pixel of interest and the peripheral pixels are arranged in directions different from one another;
calculating, as a reference dispersion, a dispersion of pixel values of all pixels in a processed region composed of the pixel of interest and peripheral pixels having the pixel of interest as its center;
calculating absolute values of dispersion differences between the respective dispersions of the plurality of pixel groups and the reference dispersion;
calculating an average of the pixel values in each of the plurality of pixel groups;
calculating, as a reference average, an average of pixel values of the all pixels in the processed region;
calculating absolute values of average differences between the respective averages of the plurality of pixel groups and the reference average; and
determining whether or not the pixel of interest belongs to a gradation region,
wherein the determining determines that the pixel of interest belongs to the gradation region when all the absolute values of average differences are equal to or smaller than a first predetermined threshold value and only one of the absolute values of dispersion differences is larger than a second predetermined threshold value, and determines that the pixel of interest does not belong to the gradation region when two or more of the absolute values of dispersion differences are larger than the second predetermined threshold value or when all of the absolute values of dispersion differences are equal to or smaller than the second predetermined threshold value.

5. A non-transitory computer readable storage medium storing an image processing program thereon which is executable by a computer to control the computer to execute processing comprising:
calculating a dispersion of pixel values in each of a plurality of pixel groups which are each composed of a pixel of interest and peripheral pixels around the pixel of interest in an image and in which the pixel of interest and the peripheral pixels are arranged in directions different from one another;
calculating, as a reference dispersion, a dispersion of pixel values of all pixels in a processed region composed of the pixel of interest and peripheral pixels having the pixel of interest as its center;
calculating absolute values of dispersion differences between the respective dispersions of the plurality of pixel groups and the reference dispersion;
calculating an average of the pixel values in each of the plurality of pixel groups;
calculating, as a reference average, an average of pixel values of the all pixels in the processed region;
calculating absolute values of average differences between the respective averages of the plurality of pixel groups and the reference average; and
determining whether or not the pixel of interest belongs to a gradation region, wherein the determining determines that the pixel of interest belongs to the gradation region when all the absolute values of average differences are equal to or smaller than a first predetermined threshold value and only one of the absolute values of dispersion differences is larger than a second predetermined threshold value, and determines that the pixel of interest does not belong to the gradation region when two or more of the absolute values of dispersion differences are larger than the second predetermined threshold value or when all of the absolute values of dispersion differences are equal to or smaller than the second predetermined threshold value.

* * * * *